(12) United States Patent
Bernhardsgruetter et al.

(10) Patent No.: US 8,950,254 B2
(45) Date of Patent: Feb. 10, 2015

(54) BEVERAGE MACHINE WITH INTEGRATED ULTRASONIC TRANSCEIVER

(75) Inventors: Raphael Bernhardsgruetter, St. Gallen (CH); Ralph Kugler, Herisau (CH); Yann Epars, Penthalaz (CH); HansPeter Pleisch, Corseaux (CH); Vincent Martin, Crissier (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 13/643,351

(22) PCT Filed: Apr. 18, 2011

(86) PCT No.: PCT/EP2011/056114
§ 371 (c)(1),
(2), (4) Date: Oct. 25, 2012

(87) PCT Pub. No.: WO2011/134814
PCT Pub. Date: Nov. 3, 2011

(65) Prior Publication Data
US 2013/0036815 A1   Feb. 14, 2013

(30) Foreign Application Priority Data
Apr. 27, 2010   (EP) ..................................... 10161139

(51) Int. Cl.
*G01F 23/00* (2006.01)
*A47J 31/52* (2006.01)
*A47J 31/44* (2006.01)
*A47J 31/56* (2006.01)

(52) U.S. Cl.
CPC .............. *A47J 31/52* (2013.01); *A47J 31/4457* (2013.01); *A47J 31/56* (2013.01)
USPC ....................................................... 73/290 V

(58) Field of Classification Search
USPC ................................ 73/290 B, 290 V, 290 R
See application file for complete search history.

(56) References Cited

U.S. PATENT DOCUMENTS 5,036,892 A * 8/1991 Stembridge et al. .............. 141/1
5,131,271 A   7/1992 Haynes et al.
(Continued)

FOREIGN PATENT DOCUMENTS

| EP | 0770859 | 5/1997 |
| WO | 2007069135 | 6/2007 |
| WO | 2009060192 | 5/2009 |

OTHER PUBLICATIONS

International Search Report and Written Opinion issued May 25, 2012 for Application No. PCT/EP2011/056114.

*Primary Examiner* — Daniel S Larkin
*Assistant Examiner* — Jamar Ray
(74) *Attorney, Agent, or Firm* — K&L Gates LLP

(57) ABSTRACT

The present invention discloses a beverage machine (1) comprising a tank (2), which holds a liquid for preparing a beverage, and a dispenser (7), to which the tank is connectable, wherein the tank (2) comprises a valve (8); the dispenser comprises an opening (9) for receiving the valve in connection of the tank on the dispenser; at least one ultrasonic transceiver (3) is disposed in the dispenser (7) or tank (2), the ultrasonic transceiver being designed to emit and receive ultrasonic waves (4a, 4b) in the liquid, in order to determine the distance (d) from the transceiver to the liquid level (5), wherein it further comprises a control unit (6), which is connected to the ultrasonic transceiver (3) which is adapted to determine the distance (d) changing with time and as a result the volume (V) of the liquid flowing out of the tank.

14 Claims, 7 Drawing Sheets

(56) References Cited

U.S. PATENT DOCUMENTS

| | | | |
|---|---|---|---|
| 5,586,085 A * | 12/1996 | Lichte | 367/99 |
| 5,774,136 A * | 6/1998 | Barbehenn et al. | 347/7 |
| 5,827,943 A | 10/1998 | Schmidt | |
| 2005/0178792 A1 | 8/2005 | Knepler | |
| 2008/0307975 A1 * | 12/2008 | Kodden et al. | 99/280 |

* cited by examiner

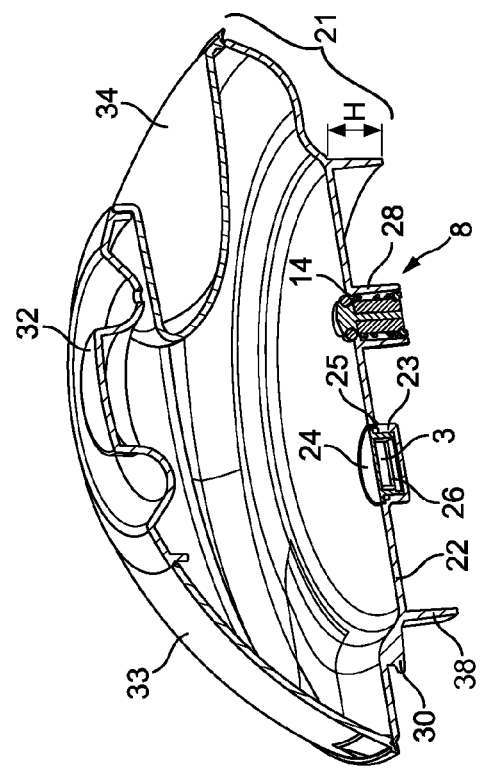
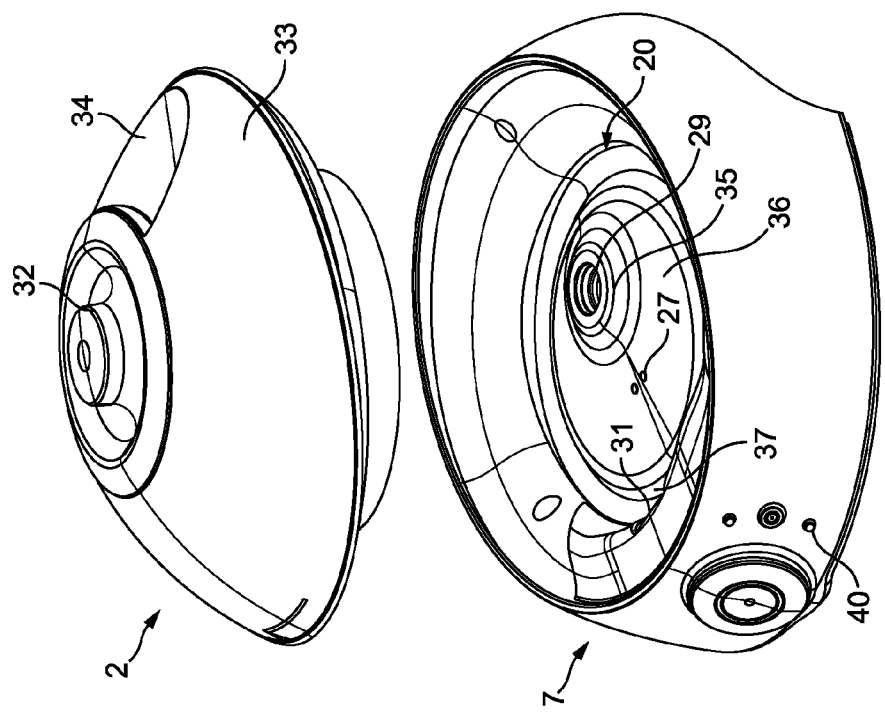

BEVERAGE MACHINE WITH INTEGRATED ULTRASONIC TRANSCEIVER

CROSS REFERENCE TO RELATED APPLICATIONS

The present application is a National Stage of International Application No. PCT/EP2011/056114, filed on Apr. 18, 2011, which claims priority to European Patent Application No. 10161139.0, filed on Apr. 27, 2010, the entire contents of which are being incorporated herein by reference.

The present invention discloses a beverage machine with an integrated ultrasonic transceiver. In particular, by means of the ultrasonic transceiver, the liquid level in a tank of the beverage machine and/or the volume of liquid flowing out of the tank can be accurately determined.

Machines for preparing hot or cold beverages typically comprise a tank, in which a liquid, like water or milk, is contained. The tank is typically removably connectable to a dispenser of the beverage machine, and when operated the beverage machine uses the liquid from the tank to prepare the beverages. Each beverage usually requires a certain volume of liquid to be mixed with the beverage ingredients. The more accurate the determination of the volume of liquid, the better the quality of the beverage. Moreover, the tank usually is supposed to hold only a maximum volume of liquid. Additionally, for preparing the beverage, a minimum volume of liquid is required. If this minimum volume of liquid is not present, it may lead to a disruption of the liquid supply which may negatively affect the prepared beverage. For instance, bubbles of gas may be trapped in the residual volume of liquid flowing out of the tank which may affect the accuracy of the beverage even if the tank is refilled during the beverage preparation cycle. Consequently, it is desired to accurately measure both the liquid level in the tank and the volume liquid, which is pumped out of the tank into the machine for the preparation of the beverage. It is also desired to prevent the interruption and/or the abnormal flow variations of the liquid from the tank into the machine during the beverage preparation cycle in order to avoid an inaccurate or inefficient preparation of the beverage.

State of art beverage machines mostly offer possibilities to determine the liquid level in the tank at least with a labeling or marking on the tank. For example, a minimum and a maximum level are typically indicated, and a level required to prepare one or two beverages is sometimes indicated. More sophisticated beverage machines comprise filling level sensors connected to an indicator, which indicate the status of the liquid level in the tank. Such sensors are for example floaters, which have a smaller density than the liquid, so that they float on top of the liquid level, and their position can be determined. Also commonly used are electrodes to measure the capacity of the environment, i.e. the liquid, which depends on the liquid level in the tank. Other sensors, which detect the pressure caused by the liquid, can be employed to determine the liquid level.

The volume of liquid flowing into or out of tanks of beverage machines is typically measured by a flow meter, like for example a rotating vane, which is rotated by the flowing liquid, and which determine the volume of flowing liquid or the flow rate based on, for example, the number of rotations per second.

Apart from the fact, that separate sensors or measuring devices are typically used in state of art beverage machines to measure the liquid level and the volume of liquid or flow rate of the liquid out of the tank, respectively, additional disadvantages exist.

Labels or markings on the tank only indicate the liquid level, give only a rough estimate and are very susceptible to movement of the liquid. It does not provide any suitable indication of the volume of liquid flowing out of the tank. Additionally, since the tank is typically positioned at the back of the beverage machine, it is not straightforward and easy for the user to take a reading of the liquid level. Floaters are also inaccurate, are sensible to blockage and damage and make the machine uneasy to clean. Other sensors, like the capacitive or pressure sensors mentioned above, need to be placed into the liquid, i.e. either inside the tank or below the tank contacting with the liquid. This makes the beverage machine much more difficult to clean, and negatively influences the reliability of the measurement devices. Moreover, the mentioned sensors only provide a limited amount of accuracy.

Also rotating vanes for measurement of the flow rate have to be placed directly into the liquid. They are not very accurate, are very fragile and easy to damage. Moreover, they can be blocked if unexpectedly some solid part flows with the liquid.

WO 2009/060192 A2 discloses electrically powered liquid heating vessels and electronic controls thereof. The heating vessels comprise a reservoir and a cordless base. The liquid level in the reservoir is measured by means of an ultrasonic transducer, which is coupled to an element plate in the reservoir. However, this invention only relates to the mere control of the level of liquid in a vessel without any liquid flowing out of or pumped from the vessel.

In view of the above-mentioned disadvantages, the present invention aims at improving the state of art. In particular a beverage machine with an accurate measurement system for controlling the liquid level in the tank, and the volume of liquid flowing out of or pumped from the tank is desired such as for precisely metering the amount of water to mix with a portion of infant formula (e.g., as a powder or concentrate) in the machine. Additionally, the measurement system should provide good accuracy at cheap manufacturing cost. The beverage machine should have a good long-term reliability, and should be easily cleanable. A simple connectivity between tank and dispenser of the beverage machine is desired.

The above-mentioned problems are solved by the present invention with a beverage machine with an integrated ultrasonic transceiver.

In a first embodiment, the present invention discloses a beverage machine comprising a tank, which holds a liquid for preparing a beverage, and a dispenser, to which the tank is connectable, wherein the tank comprises an outlet valve;
the dispenser comprises an opening for receiving the outlet valve in fluidic connection of the tank on the dispenser;
at least one ultrasonic transceiver is disposed in the dispenser and/or tank,
the ultrasonic transceiver being designed to emit and receive ultrasonic waves in the liquid, in order to determine the distance from the transceiver to the liquid level,
wherein it further comprises a control unit, which is connected to the ultrasonic transceiver; such unit being adapted to determine the distance changing with time and as a result the volume of liquid flowing out the tank.

The ultrasonic transceiver provides an easily implementable device for measuring the liquid level in the tank with high precision. Moreover, with the ultrasonic transceiver the water volume can be determined by the control unit addressing the change of the measured liquid level with time.

Preferably, a profile of the tank is stored in the control unit, and the control unit is adapted to determine the volume of liquid flowing out of, or pumped from, the tank based on said profile and the distance changing with time. For this, the control unit comprises a memory in which the profile of the tank is stored. The memorized profile of the tank is determined by integrating the surface area of the liquid level in the tank along the distance (e.g., depth) of the tank from a maximum surface area to a minimum surface area of the liquid level. The control unit is configured to control the volume of liquid of a beverage by interrupting the flow of liquid by once a set point of volume has been reached or a threshold exceeded. The interruption of the flow of liquid can be typically obtained by the control unit switching off the pump in the dispenser and/or actively closing the outlet valve.

With such a system, both the liquid level and the volume of liquid dispensed from the tank can be accurately determined.

The control unit may optionally be adapted to determine the flow rate of liquid flowing out of the tank or pumped from the tank by computing the variation of the volume of liquid flowing out of, or pumped from the tank by time unit.

Furthermore, only a single ultrasonic transceiver is necessary. The control unit can also be integrated into the ultrasonic transceiver and the memory embedded therein. Both the liquid level and the volume of liquid delivered can be determined very precisely without the implementation of complicated and fragile flow meters, such as rotating vanes.

For a flow meter function, a precise volume is determined by controlling the variations of volume as a function of time within very small time intervals, e.g., in the order of a few milliseconds, and, e.g., by stopping the pump when the determined volume reaches a set volume.

It should be noted that the liquid can flow out of the tank to the dispenser by gravity only (without use of a pump in the dispenser). This can be the case when a low pressure of liquid is enough. In such case, it would be preferable to have an active valve for controlling the liquid flow; such valve being under control of the control unit and be placed at the tank and/or dispenser.

Preferably, the beverage machine further comprises an alerting signal unit for indicating, whether the distance crosses (i.e., exceeds or falls short of) a predetermined threshold level. Thus, the user knows exactly if, for example, enough liquid for the preparation of one or more beverages is present in the tank, or whether a critical minimum or maximum liquid volume is reached. The signal unit can comprise a light emitting unit which may be positioned on the front side of the beverage machine, where it is easily observable for the user. The alerting signal unit can be a light emitting unit, a sound emitting unit or a combination thereof.

In conjunction with the alerting signal unit or alternatively, means for interrupting the liquid flow to the dispenser are provided when the distance crosses a predetermined threshold level. Such flow interrupting means may be integrated in the control unit as a program for switching off the pump in the dispenser.

The alerting signal unit may also be arranged for indicating when an error is detected in the flow rate (i.e., variation of volume at time intervals). For instance, if the flow rate abnormally decreases or stops before the set volume is reached, the alerting signal unit is activated. For example, the alerting signal may indicate flow restriction conditions in the fluid circuit such as because of an important limestone deposit in the circuit thereby requiring a descaling program to be put in place or run. In conjunction and/or alternatively, the flow supply can be interrupted by the flow interrupting means such as by switching off the pump of the dispenser in order to avoid damaging the beverage machine and/or incorrectly preparing the beverage.

The alerting signal unit may also be arranged for indicating when the volume of liquid reaches the set point of beverage volume at the end of the beverage preparation. As known per se, several set points for different beverage volumes (e.g., 30, 50, 70, 120, 220 ml) are stored in the memory of the control unit.

In a first mode, the ultrasonic transceiver is disposed in the opening of the dispenser below the outlet valve. The position of the opening corresponds to the position of the valve when the tank is in position on the dispenser. The valve is designed to open to allow the ultrasonic transceiver to emit and to receive ultrasonic waves into the liquid in the tank. In particular, the valve is arranged to be pushed sidewise by pushing means of the dispenser as a result of the tank being inserted on the dispenser. For example, the valve can be pushed by a slanted surface in the opening of the dispenser. The rear of the valve can also be slanted to take a proper side position when engaged by the slanted surface of the dispenser. With the position of the ultrasonic transceiver in the dispenser, the tank can be easily removed, refilled or cleaned. Since a direct contact between the liquid and the transceiver is not necessarily required, the beverage machine can exhibit a longer lifetime.

By positioning the ultrasonic transceiver in the dispenser, a simple tank, made for example of plastic or another suited material, can be used. The tank does not need any electric connectors, and if removed from the dispenser, the ultrasonic transceiver is not moved. The tank becomes much easier to clean with such an arrangement. By equipping the tank with said valve, which overlaps with the opening of the dispenser, and opens when the tank is connected to the dispenser, the liquid level measurement can be performed more precisely, because emitted ultrasonic waves are not blocked by a tank bottom wall or the closed valve, or some other blocking element, which could cause unwanted reflections and thus a deterioration of the measurement. Moreover, the opened valve allows the beverage machine to pump liquid from the tank, in order to prepare the beverages. Preferably, the dispenser comprises a cavity, in which the ultrasonic transceiver is disposed. The cavity is separated from the other portion of the dispenser, and when the tank and dispenser are connected, the outer surface of the top of the cavity is in direct contact with the liquid in the tank, and emits the ultrasonic waves directly into the liquid.

By disposing the ultrasonic transceiver in the cavity, the component is separated from the liquid in the dispenser. Thus, if the beverage machine prepares a beverage, and therefore pumps liquid from the tank through the dispenser, the ultrasonic transceiver is protected from the liquid. This increases the lifetime of the transceiver, and makes a cleaning thereof less often necessary. Moreover, the flow path of the liquid is not blocked. Through the top of the cavity the ultrasonic waves are emitted. Because the outer surface of the top is in direct contact with the liquid in the tank once the valve opens, no unwanted reflections from intermediate air layers or other materials blocking the path of the ultrasonic waves occur, and thus the measurement of the liquid level and/or the flow rate is more reliable and precise.

Preferably, the ultrasonic transceiver is in direct contact with the inner surface of the top wall of the cavity. Thus, no air layer or any other material layer is present between the ultrasonic transceiver and the inner surface of the top of the cavity. Therefore, the ultrasonic waves can be most efficiently coupled from the transceiver into the top part of the cavity, and from there they can be coupled most efficiently into the liquid in the tank, because it has direct contact with the outer surface of the top of the cavity. Unwanted reflections, other than the reflections at the liquid level, caused e.g. by air layers located in between transceiver and cavity top, are avoided, and the measurement signal can be optimized.

Preferably, the top of the cavity is as broad as the opening is wide. This provides a good coupling between the ultrasonic waves and the liquid.

In a second mode of the invention, the ultrasonic transceiver is connected on or at the bottom wall of the tank. The transceiver is preferably transversally distant from the outlet valve on the bottom wall. The term "transversally distant" here refers to the distance between two points in a direction parallel to the liquid surface in the tank. The transceiver may be positioned in a cavity of the bottom wall which is isolated from the liquid in the tank but transparent enough to ultrasounds in the direction of the top of the tank. The transceiver has wireless connectors arranged to become electrically plugged to the dispenser as a result of the tank being inserted in liquid communication on the dispenser. The transceiver is preferably axially distant from the valve which is engaged in the opening of the dispenser.

Preferably, the cavity may be formed as an integral part of the bottom wall of the tank. It may extend towards the inside of the tank and, in such case, it must be imperviously closed by a (e.g., plastic) sealing top wall. The cavity may also extend towards the outside of the tank and be, preferably imperviously closed, by a rear lid. The cavity may also be formed by a (e.g. plastic) casing which is separate from the wall of the tank and connected to it such as by welding or gluing. In all cases, the cavity further comprises small apertures at the wall or lid in contact with the rear contact side of the transceiver (such as in the bottom wall of the tank in the first mode) for allowing the electrical connectors of the transceiver to protrude outwardly from the tank for enabling a wireless connection with the dispenser during insertion of the tank on the dispenser. The connectors can be spring biased as known per se.

The ultrasonic transceiver may be electrically connected to the dispenser by wireless connection means such as electrical contacts (e.g., pins and rivets) or by contactless connection means such as electro-magnetic coils.

In this mode, the electrical connection of the transceiver can be used to detect the presence of the tank on the dispenser. Such presence can be detected via a voltage or current or any other suitable electrical detection by the control unit of the beverage device. The detection of the tank by such means can be associated to a light emitting signal means (e.g., LED) on the device.

Of course, the key emitting and receiving means of the transceiver can also be distributed in the tank and dispenser. For instance, the ultrasound transmitter may be part of the tank and the ultrasound receiver is part of the dispenser, such as placed in the outlet opening, or vice versa.

In general (i.e., for all the modes), the control unit is further designed to perform an A/D conversion to obtain a received signal corresponding to the received ultrasonic waves.

Preferably, the ultrasonic transceiver is a 1.4 MHz sensor.

Preferably, the control unit is further designed to analyze the received signal at a fixed given voltage level, whereby always the same period slope of the received signal is used for the analysis, preferably the analysis is performed at a phase of 30° of the signal period of the ultrasonic waves and/or with a signal amplitude variation of the ultrasonic waves not larger than 1:2.

Preferably the control unit is further designed to operate at least at 8 MHz, preferably at least at 16 MHz.

With the above-mentioned electronic design implementations, the resolution of the measurement of the liquid level and/or the flow rate can be improved.

Preferably, the control unit is further designed to average the measurements of the distance for about 0.5 seconds.

By averaging the measurements, level deviations of the liquid level caused by a turbulent water surface can be prevented. For best possible outcome of the measurements, the liquid level should be as calm as possible.

Preferably, the ultrasonic transceiver comprises a piezoelectric element, which is adapted to be periodically stimulated by a short voltage pulse to emit the ultrasonic waves.

In an aspect, the invention relates to a valve assembly between a tank and a dispenser, to which the tank is connectable. The valve assembly comprises a valve at the bottom of the tank, wherein if the tank and dispenser are connected, the position of the valve corresponds to the position of an opening at the top of the dispenser, and at least one ultrasonic transceiver is disposed in the dispenser, designed to emit and to receive ultrasonic waves through the valve into and out of the liquid in the tank, in order to determine the distance from the tank bottom to the liquid level.

The valve assembly of the present invention allows positioning of the ultrasonic transceiver in the dispenser, so that the tank can be easily removed and cleaned. Moreover, since the valve unblocks the emitted ultrasonic waves if opened, a better coupling of the ultrasonic waves into the liquid is achieved, and thus the measurements of the liquid level and/or the flow rate are more reliable.

Another aspect of the present invention discloses a method for monitoring a liquid level in a tank of a beverage machine. The method comprises the steps of connecting the tank to a dispenser of the beverage machine, thereby opening a valve of the tank, emitting an ultrasonic wave through the valve into the liquid in the tank, receiving an ultrasonic wave reflected at the liquid level through the opening, and consequently determining the distance from the tank bottom to the liquid level based on the ultrasonic waves, and the volume of liquid flowing out or, or pumped from, the tank.

By measuring the liquid level in a tank of a beverage machine with an ultrasonic transceiver, a very precise and fast method is obtained, because the ultrasonic waves are reflected directly at the interface between liquid and air. By integrating the ultrasonic transceiver into the dispenser, the tank of the beverage machine remains removable for refilling or cleaning, and the connectivity between dispenser and tank remains simple.

The invention also relates to a beverage machine comprising a tank which holds a liquid for preparing a beverage and a dispenser to which the tank is fluidically connectable, wherein:

the tank comprises an outlet valve at its bottom;
the dispenser comprises an opening at its top for fluidic connection with the outlet valve;
at least one ultrasonic transceiver is positioned in the dispenser and/or tank to emit and to receive ultrasonic waves through the outlet valve into and out of the liquid in the tank, in order to determine the distance from the tank bottom to the liquid level and optionally, the volume of liquid flowing out, or pumped from the tank.

Another invention relates to a water tank for beverage machine comprising a bottom portion intended to be inserted on a seat of a beverage dispenser, the bottom portion comprising a bottom wall with a water outlet such as An outlet valve assembly, wherein the bottom portion comprises support means arranged to be longer than the valve assembly and arranged for maintaining the water tank on a planar surface without the water outlet contacting the planar surface. Such a configuration of the water tank solves a problem of hygiene since the valve assembly is never in contact with the planar surface when the water tank is put on the planar surface such as kitchen table.

The invention is further defined by the appended claims which are hereby incorporated by reference.

The present invention will be described in more detail below, in reference to the attached drawings.

Figure 4:
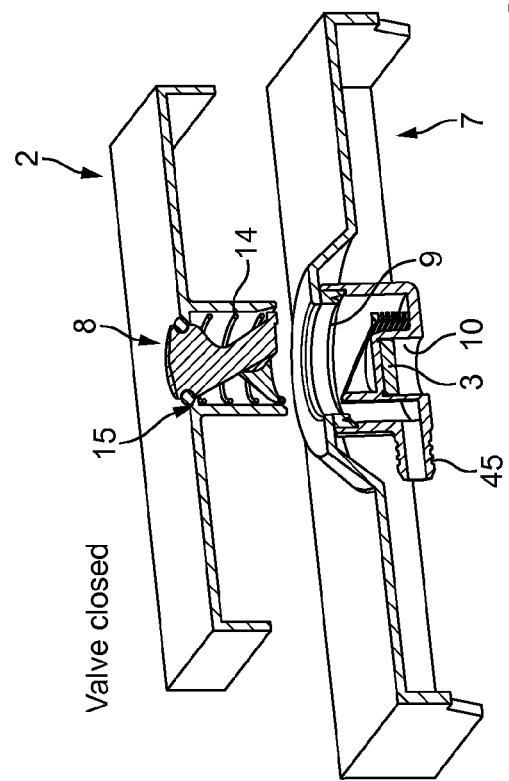
Figure 4:
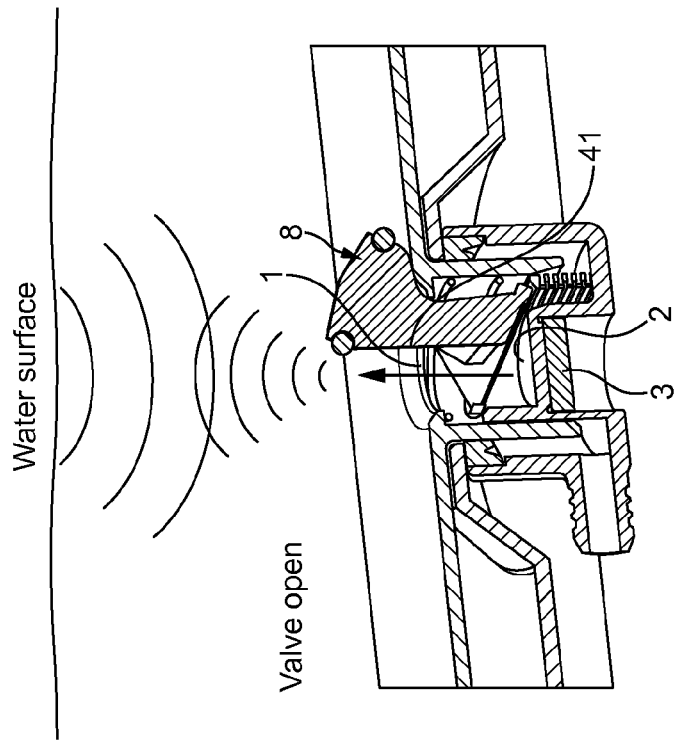

FIG. 4 compares the valve assembly of the beverage machine of the present invention, when the valve is closed and when the valve is open.

Figure 5:
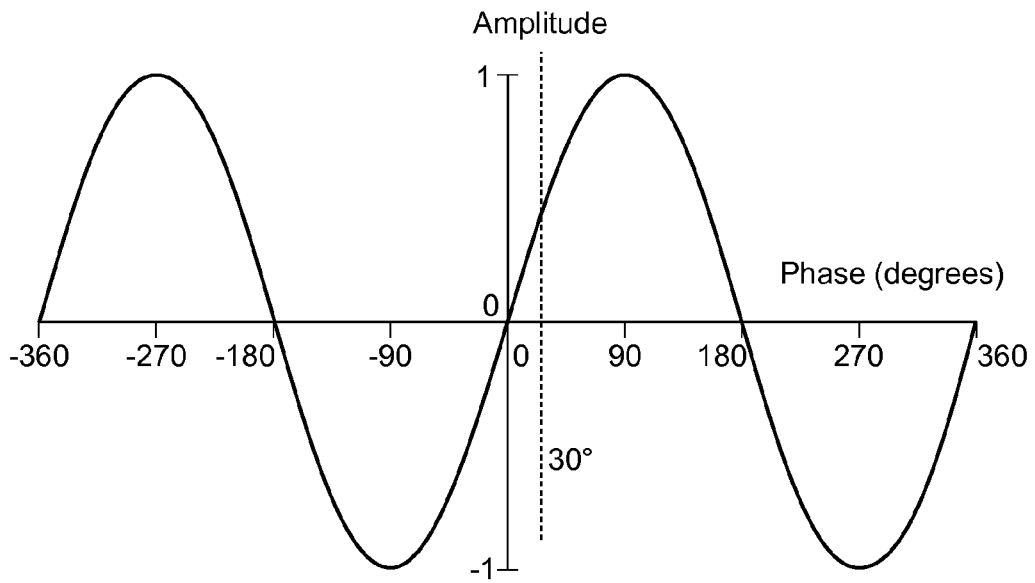

FIG. 5 shows a measurement signal of the present invention.

Figure 6:
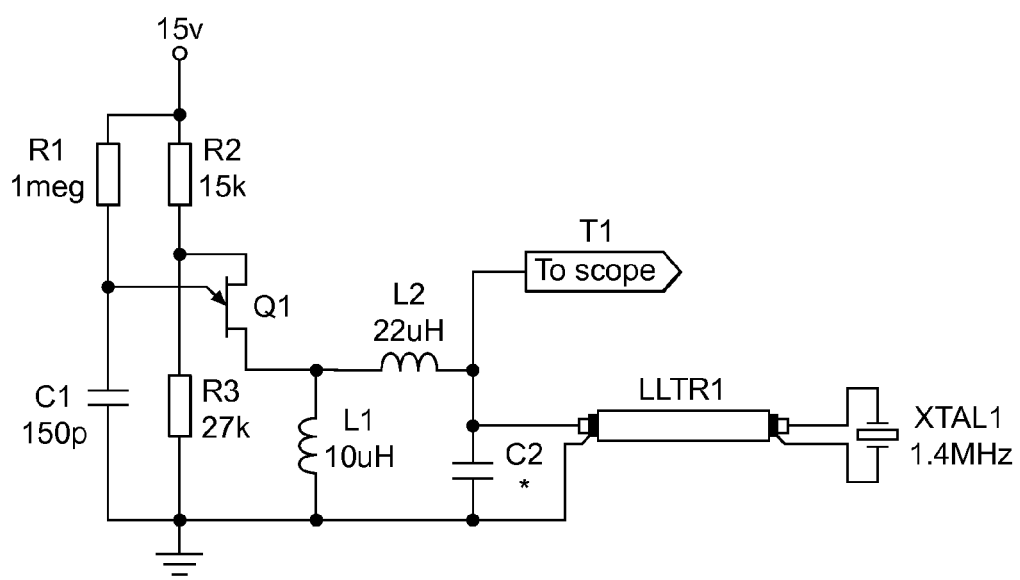

FIG. 6 shows a unijunction transistor, with which the ultrasonic transceiver of the present invention is stimulated.

Figure 7:
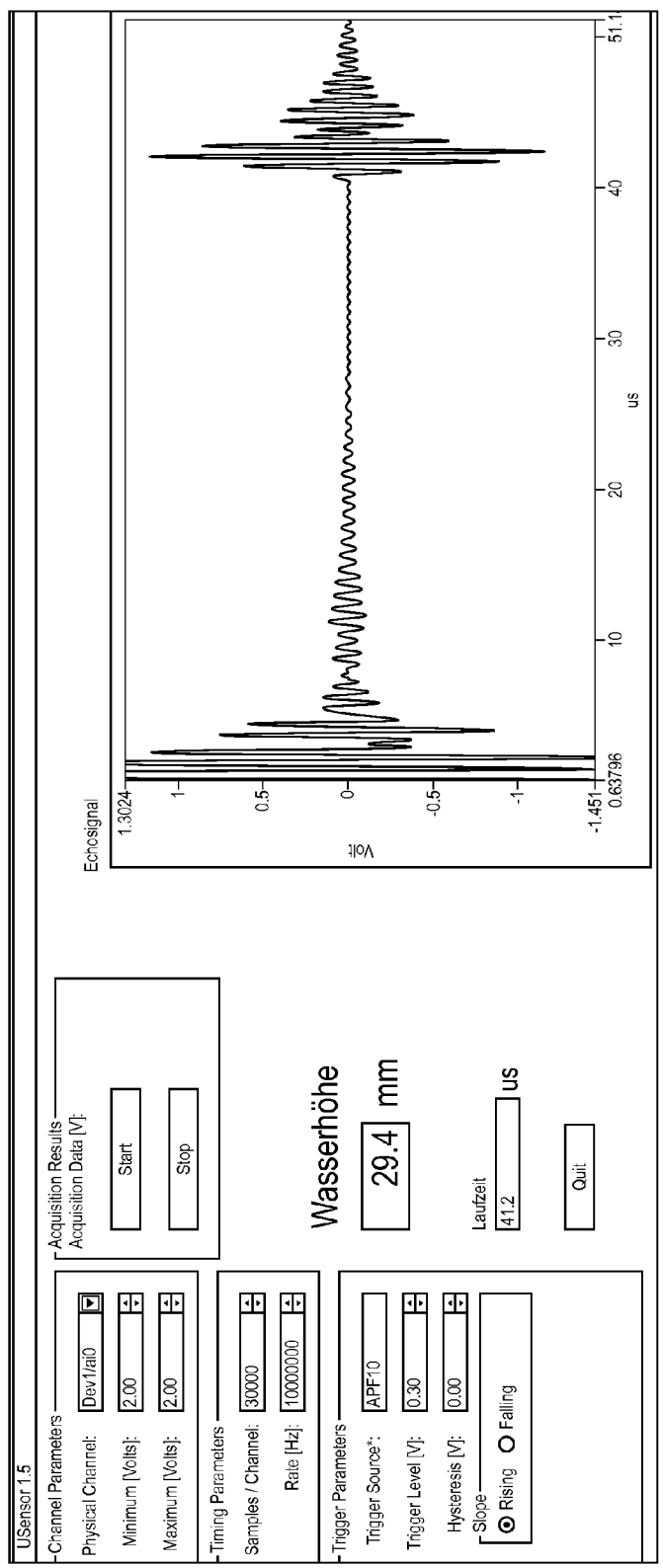

FIG. 7 shows a signal obtained by performing the method according to the present invention.

Figure 8:
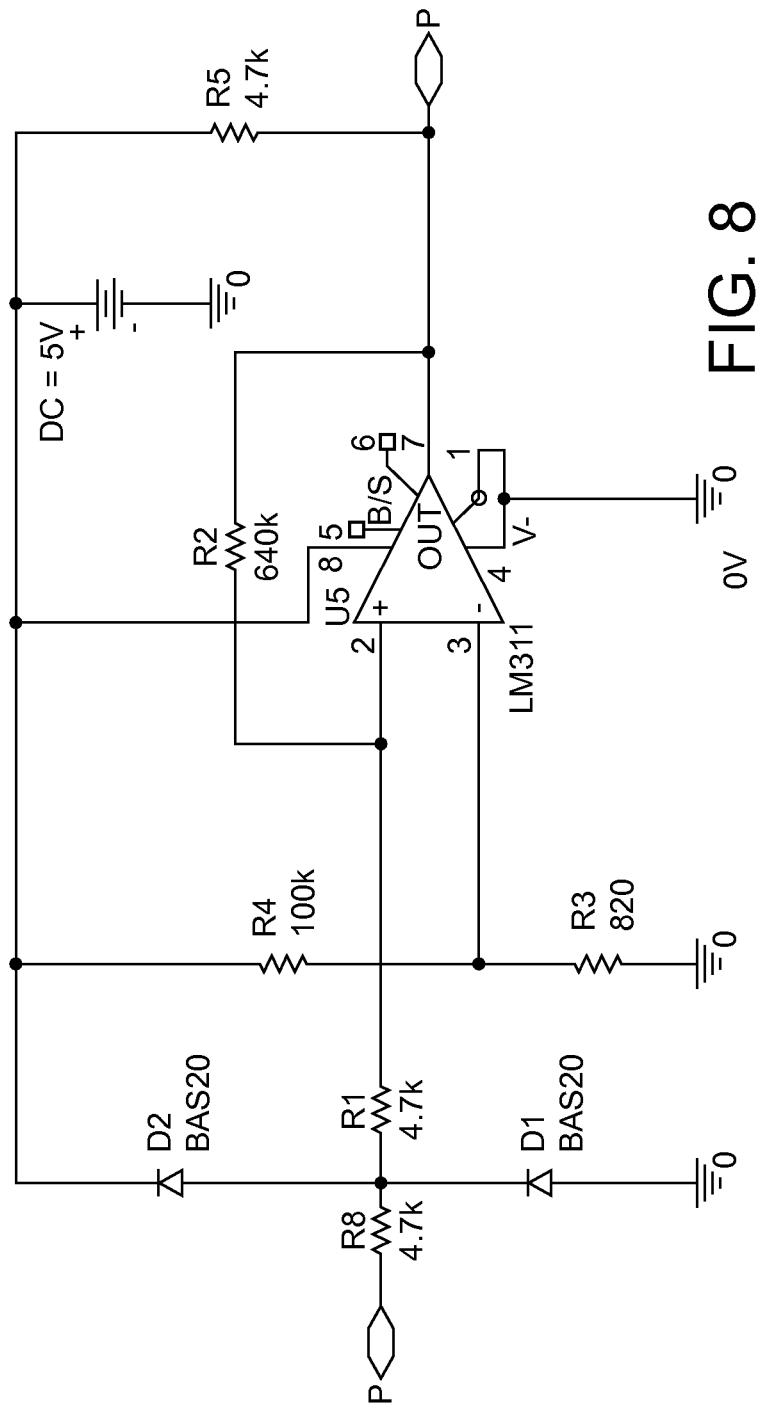

FIG. 8 shows a simple Schmitt-Trigger circuit used to evaluate the signal obtained by the method of the present invention.

FIG. 9 shows a second mode of the dispenser and tank of the invention;

FIG. 10 shows the water tank of the second mode.

Figure 1:
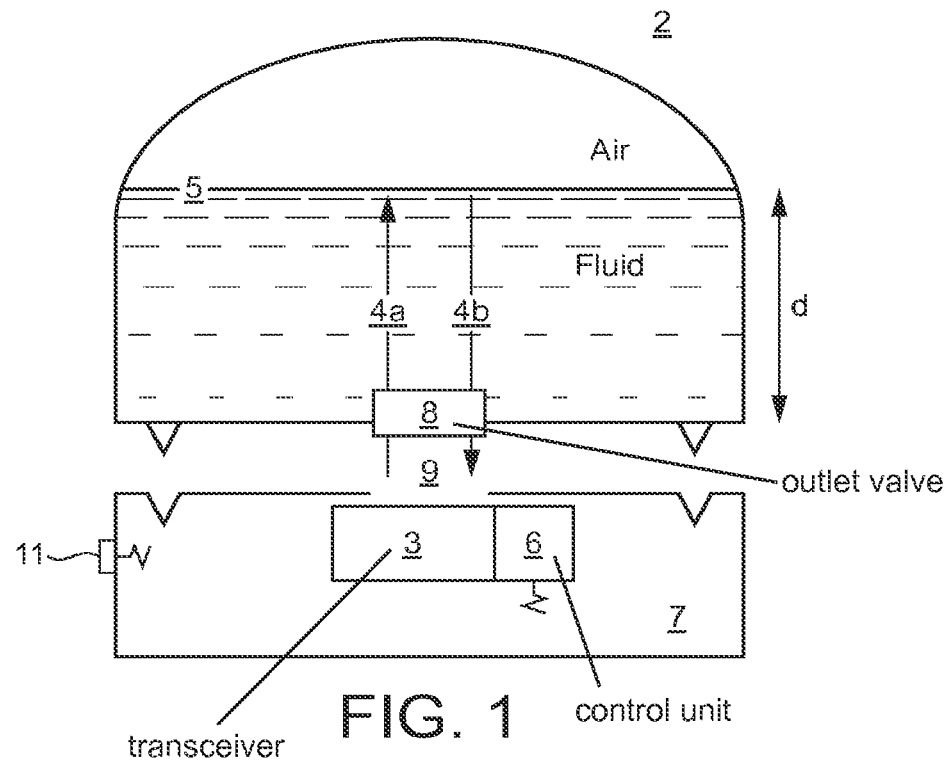
FIG. 1 shows a schematic representation of the tank, the dispenser and the ultrasonic transceiver of the beverage machine of the present invention according to a first mode.

FIG. 1 shows a tank 2 and a dispenser 7 of a beverage machine of the present invention. The tank 2 holds liquid (indicated by the shaded area), which is used by the beverage machine for the preparation of hot or cold beverages. As a preferred, but non-limiting example, the machine is designed for preparing a nutritional liquid such as an infant formula. For sake of clarity, the well known parts of the beverage machine such as the pump, the heater and the brewing (or dilution) unit are not represented. Typically, the liquid in the tank is water. However, the present invention is not restricted to tanks holding water and the tank could hold a different liquid such as milk. For example, the liquid can then be mixed with a portion of ingredient such as infant formula powder or liquid concentrate contained in a packaging container (e.g., a portioned capsule or sachet).

The interface between the liquid and air in the tank is the liquid level 5. A distance from the bottom of the tank to the liquid level 5 is indicated by the double-arrow on the right side of the tank, and is denominated with d. An ultrasonic transceiver 3 is located in the dispenser 7 below the tank 2, as will be explained in more detail below. The tank 2 is preferably made of plastic, because it is cheap to manufacture and light of weight. Moreover, it is easy to clean, and can even be designed to be cleaned in a dishwasher. However, the tank 2 can also be made of other materials, which are able to contain the liquid and are able to emit ultrasonic waves coupled in from the transceiver 3, i.e. if the transceiver 3 is positioned outside the tank 2. Even though the form of the tank 2 is indicated as being rectangular at the bottom part and globe-like at the top part, the tank 2 can exhibit any form, which fits with the beverage machine 1.

The ultrasonic transceiver 3 is able to emit ultrasonic waves 4a, and is able to receive ultrasonic waves 4b. The emitted ultrasonic waves 4a are—as will be explained below in more detail—coupled into the liquid, and propagate through the liquid until they reach an interface between liquid and air at the liquid level 5. At this interface 5, the ultrasonic waves 4a are reflected, and the reflected waves 4b are received after a certain period of time by the ultrasonic transceiver 3. The ultrasonic transceiver 3 measures this period of time it takes for the return of the emitted ultrasonic waves 4a, and since the speed of the ultrasonic waves 4a, 4b in the liquid is known, the ultrasonic transceiver can determine the distance d from the bottom of the tank 2 to the liquid level 5 based on the detected time difference from emission to reception of ultrasonic waves 4a, 4b. This time difference and/or the distance d are subsequently transmitted by the ultrasonic transceiver 3 to a control unit 6, which is electrically connected to the transceiver 3. The control unit 6 can also be integrated with the ultrasonic transceiver 3. The control unit 6 can further comprise a storage device, in which relevant information, for example propagation speeds of ultrasonic waves in different liquids, are stored. Moreover, a profile of the tank can be stored in the control unit 6. Such a profile for example describes the exact topography of the tank, or is similar information, which unambiguously relates the volume of liquid in the tank 2 to the liquid level 5. The simpler the profile of the tank 2 is designed to be, the easier and more precise the flow rate can be determined. Ideally the tank 2 is designed with an internal volume wherein the volume variation (increase/decrease) relates linearly to the distance d such as a cubic, parallelepiped, cylindrical and the like.

The ultrasonic transceiver 3 and the control unit are supplied with power through the dispenser 7. The dispenser 7 can have a cable connection to some voltage source, or can receive voltage via inductive coupling. Likewise, connectors can be hardwired inside the dispenser 7 to supply power to transceiver 3 and control unit 6, or an inductive coupling of power can be carried out. The dispenser 7 can be also equipped with a battery, which can be rechargeable with an external power supply. The ultrasonic transceiver 3 and/or the control unit 6 can have individual power switches, which can for example be provided on a housing of the beverage machine. Thus, when measurements are not needed, even when the beverage machine consumes power for preparing beverages, the components are disconnected from the power supply to save stand-by current.

In order to determine the volume or flow rate out of the tank 2, in particular the volume leaving the tank to the dispenser when sucked by the pump of the dispenser in the liquid circuit (not shown), the ultrasonic transceiver 3 performs multiple of the above described measurements of the distance d. The measurements can be either performed continuously, or discretely. With each measurement a new distance d is determined by the transceiver, and is transmitted to the control unit 6. The faster two measurements follow each other, the more precise the dispensed volume or flow rate can be determined. During the subsequent measurements the ultrasonic transceiver can continuously emit and receive ultrasonic waves. Alternatively, the transceiver 3 emits and receives ultrasonic waves only at given intervals, which consumes less power. Based on the profile of the tank, which is stored in the control unit 6, and which relates a volume of liquid in the tank 2 to a liquid level 5, the control unit 6 can monitor the change of the distance d with time, or with each individual measurement step, respectively, and can determine the flow rate. For example, if the control unit 6 knows how many deciliter of liquid correspond to a certain change of liquid level 5, if the liquid level 5 decreases or increases, it can determine the dispensed volume or flow rate.

For the best resolution of the measurement, i.e. of the distance d, the dispensed volume (or flow rate), the ultrasonic transceiver 3 is positioned centered in respect to the width of the tank 2. Thus, also the ultrasonic waves 4a and 4b propagate mainly in the center of the tank 2, and reflect at the interface 5 of liquid and air. In the center of the tank 2 the liquid level 5 is more likely to be stable, even if a movement of the beverage machine 1 causes a turbulent liquid surface. Typically, at the edges of the tank 2 such turbulences cause a stronger increase or decrease of the liquid level 5.

The preferred solution for disposing the ultrasonic transceiver 3 is shown in FIG. 1. The beverage machine 1 comprises the dispenser 7, which pumps liquid from the tank 2, if the beverage machine 1 is operated to prepare beverages. The dispenser 7 and the tank 2 can be connected removably, as is indicated by the triangular projections 13a on the tank 2, and the corresponding triangular recesses 13b on the dispenser 7. The triangular projections/recesses formalize a complementary fitting of the tank on the dispenser to ensure a proper fluidic connection between the tank and dispenser as will later explained. However, such complementary fitting can be obtained by many different designs and/or structures. For operation of the beverage machine the tank 2 has to be connected to the dispenser 7, and for refilling the tank 2 or cleaning the tank 2, it can be taken off the dispenser 7. Preferably the tank 2 stands on the dispenser 7 in the connected state. The ultrasonic transceiver 3 is preferably disposed within the dispenser 7. Thus, when the tank 2 is removed from the dispenser 7, for refilling or cleaning, the transceiver 3 does not need to be removed. The tank 2 can thus be made a much simpler tank, with no electronic components or electric connectors. Furthermore, the tank 2 is much simpler to clean, and also much lighter. When the tank 2 is connected to the dispenser 7, the ultrasonic transceiver is located directly beneath its bottom, and is preferably centered in respect to its width.

Figure 3:
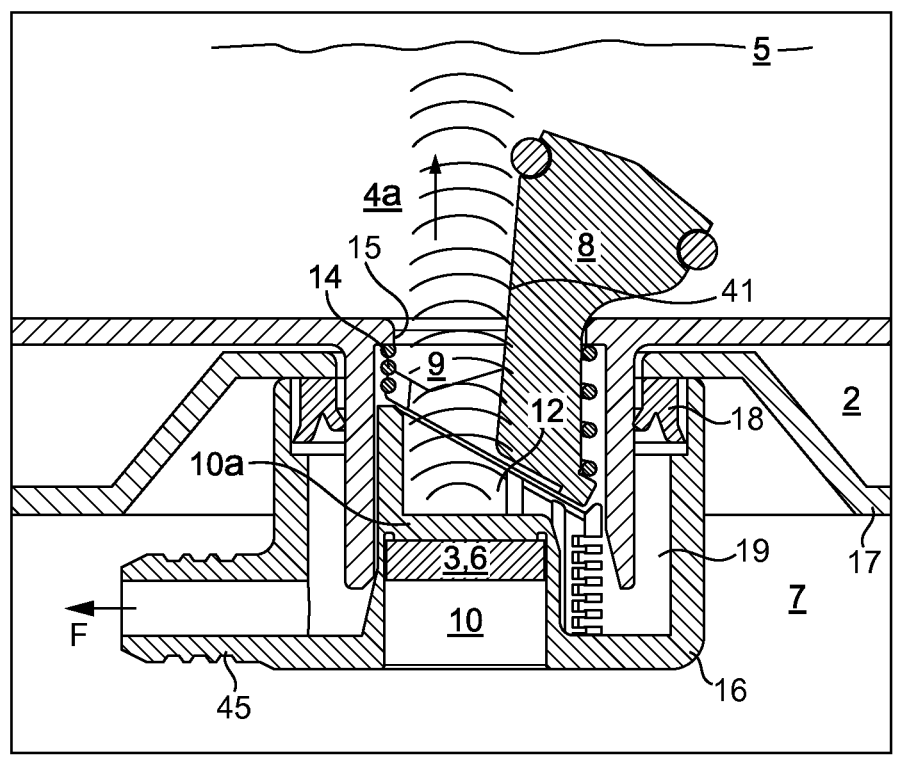
FIG. 3 shows a broader and more precise representation of the valve assembly of the beverage machine of the present invention, when tank and dispenser are connected.

The tank 2 additionally comprises an outlet valve 8 at its bottom. The dispenser 7 comprises a corresponding opening 9 at its top, and if the tank 2 and the dispenser 7 are connected, the valve 8 position and the opening 9 position exactly overlap, so that liquid can flow from the tank 2 into the dispenser 7 when the beverage machine is operated. Furthermore, by using an automatic mechanism the valve 8 is opened, when the tank 2 is put on the dispenser 7 for connection. For example, a mechanism can be used, where the valve 8 is pushed to the side by an inclined plane 12 of the dispenser 7, as shown in FIG. 3. The inclined plane 12 tilts the valve 8 under pressure, the valve 8 is for example rotatable or slideable, and the opening 9 is exposed. In FIG. 3 the valve 8 is built in such a manner, that when it is pushed to the side, the bottom of the valve is empty, and through the opening 9 of the dispenser 7 liquid can be pumped into the beverage machine 1. A spring 14 can be used to cause the valve 8 to automatically close, once the tank 2 is removed from this dispenser 7, so as to prevent liquid from leaking out of the tank 2. The spring exerts a force onto a bottom part of the valve 8 in opposite direction as the tilted plane 12, thereby tilting it back to its initial position and closing the opening 9.

As can be seen in FIG. 1 and FIG. 3, when the valve 8 is pushed to the side (and upwardly) to disengage from its seat 15, the path of the emitted ultrasonic waves 4a into the liquid becomes unblocked. Thus, the ultrasonic waves 4a are directly coupled into the liquid, and are reflected only at the liquid-air-interface at the liquid level 5. A blocked path would reduce the signal strength, and would create the danger of unwanted reflections, which would lead to incorrect measurement results.

Figure 2:
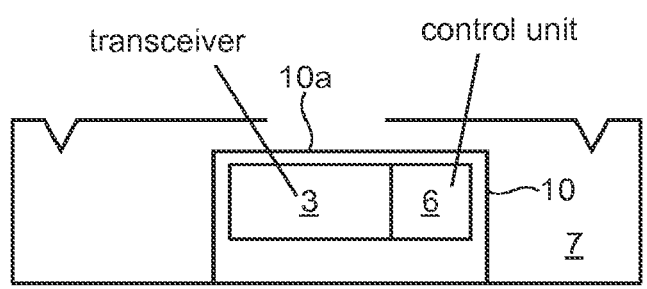
FIG. 2 shows the dispenser and the ultrasonic transceiver of the beverage machine of the present invention according to the first mode.

As shown in FIG. 2 schematically, and in more detail in FIG. 3 the ultrasonic transceiver 3 and the control unit 6, which can be either integrated or separate parts, are disposed in, e.g., a cavity 10 of, the dispenser 7. The cavity 10 is separated from the rest of the dispenser, so that no liquid pumped from the tank 2 to the dispenser 7 enters the cavity 10. Thereby, the ultrasonic transceiver and the control unit 6 are protected from direct contact with the liquid.

For example, the cavity 10 is provided in the external side of a hose coupling 16 which is connected in a fluid-tight fashion to the dispenser base 17 via a seal 18 and connection means (not shown). The hose coupling can, for instance, form an annular chamber 19 surrounding the cavity 10 and the valve such that liquid is allowed to leave the valve without being too much hindered and so without creating too much pressure drop. The hose coupling can further connect to a fluid line (not shown) by a gland 45. The flow of liquid can thus be directed in a radial direction (flow F) or any other suitable direction depending on the configuration of the coupling.

This increases the reliability and the lifetime of those electronic components. Moreover, the rest of the system becomes much easier to clean, because only flat and even surfaces are present. The ultrasonic transceiver 3 is ideally attached to the inner surface of the top wall 10a of the cavity 10. The ultrasonic transceiver 3 should be attached in such a way, that no air or other residues or material are in between the inner surface of the top wall 10a of the cavity 10 and the transceiver surface. The cavity 10 can for example be made of plastic, and the transceiver 3 can be attached to the inner surface of the top wall 10a of the cavity 10 by a vulcanization-like process. The transceiver 3 can be also part of the top wall 10a, or inside the top wall 10a of the cavity 10. If special glue is used, which does not interfere with the ultrasonic waves 4a, the transceiver 3 can also be glued and/or press-fitted to the inner surface of the top wall 10a of the cavity 10.

If the valve 8 is opened, in a state where the dispenser 7 and tank 2 are connected, the liquid enters the dispenser 7 and comes into direct contact with the outer surface of the top wall 10a of the cavity 10. All air is pushed away by the liquid. When the ultrasonic transceiver 3 is operated, the ultrasonic waves 4a are coupled to the top wall 10a of the cavity and are emitted from the outer surface thereof directly into the liquid of the tank 2. Because no air layers are present between cavity 10 and liquid in such a valve assembly, the coupling of the waves 4a into the liquid is optimized. The material of the cavity surface 10a should be chosen such that ultrasonic waves 4a emitted from the ultrasonic transceiver 3 are emitted into the liquid without or with only little signal loss. Plastic or similar synthetic materials represent a good choice.

In FIG. 4 an overview over the described operation of the valve assembly is shown. On the left side of FIG. 4, the tank 2 and the dispenser 7 are shown in a disconnected state, in which the valve 8 is pushed into its liquid-tight closing position, against its seat 15 at the bottom of the tank, for example by the spring 14. Of course other mechanisms can be employed, which push or move the valve 8 back into its closing position in a similar manner. On the right side of FIG. 4 a state is shown, in which the tank 2 is placed onto the dispenser 7. The opening 9 of the dispenser 7 and the valve 8 overlap, and due to the tilted plane 12, the valve 8 is pushed sideways (and upwardly), thus opening a path for the liquid, and also for the ultrasonic waves 4a emitted by the ultrasonic transceiver 3 or the top wall 10a of the cavity 10, respectively. The valve 8 has preferably an asymmetrical design with a biased side surface 41 on the higher plane side, so that the passage created by the displacement of the valve is sufficient to not significantly hinder the liquid flow entering the opening 9. The ultrasonic waves 4a propagate through the liquid up to the liquid level 5, and are reflected as waves 4b, and received again by the ultrasonic transceiver 3. The determination of the distance d to the liquid level 5 is then performed as mentioned above.

To ensure a good coupling between the ultrasonic waves and the liquid, the top wall 10a of the cavity 10, to which the ultrasonic transceiver 3 is mounted, should be as large as possible. Ideally, the surface 10a of the cavity 10 is as broad as the opening 9 of the dispenser 7 is wide. However, sometimes this is not possible, due to the required liquid path inside the dispenser 7.

The beverage machine 1 can be additionally equipped with an alerting signal unit 11, which is electrically connected to the control unit 6 and/or the ultrasonic transceiver 3. The alerting signal unit 11 can for example be made from light emitting diodes (LED), which provide a signal, for example blinking, when the distance d exceeds and/or falls short of a predetermined threshold level. Such a predetermined threshold level can for example indicate that the amount of liquid in the tank 2 is not sufficient to prepare one beverage and/or a given number of multiple beverages. Also a minimum volume or a maximum volume in the tank 2 can be indicated. The signal unit 11 is preferably disposed outside the beverage machine 1, where it is easily observable by the user. The signal unit 11 can, however, be also inside of the dispenser 7 and covered with a transparent window. Thus the signal unit 11 could be also disposed in the cavity 10, where it is protected from the liquid. The signal unit 11 can also indicate other, for example timed events, like a necessary cleaning of the beverage machine 1. The signal unit 11 can also indicate, whether the tank 2 is properly connected to the dispenser 7 or not and/or if the valve 8 is properly opened or closed. The signal unit 11 can further indicate, whether a measurement of the liquid level 5 is performed correctly, or if error exceeds a certain level. Moreover, also a numeric display is feasible, which shows, based on the determined liquid level 5 and a calculation based on stored beverage parameters, for how many beverages the liquid in the tank 2 is sufficient. The signal unit 11 can also indicate the flow rate value, or can indicate, whether the flow rate is sufficient, too slow and/or too fast for a predetermined beverage, which is to be prepared. In case, the control unit 6 can automatically issue a warning signal, or can automatically interrupt the preparation of the beverage.

To obtain a good resolution for the measurement of the liquid level 5 or the flow rate, several improvements can be performed. The ultrasonic wave frequency should be as high as possible, thus the resolution is mostly limited by the analysis of the received signals. The control unit 6 is able to perform an A/D conversion to convert the received ultrasonic waves 4b, which have been reflected at the interface 5 of air and liquid into a received signal. Since with low cost ultrasonic transceivers 3 the signal is only analyzed at a fixed predetermined voltage level, to achieve the best possible solution always the same period slope of the received signal should be taken. A typical sinusoidal wave-form of a received signal is shown in FIG. 5. The vertical axis shows the amplitude, while the horizontal axis shows the phase in degrees. For the best possible resolution, the measurement should be performed at a phase of 30°. Additionally, the variation of the amplitude should be maximal 1:2. By using a 1.4 MHz sensor as ultrasonic transceiver 3, with the mentioned settings the possible resolution for the determination of the distance d is about 0.05 mm. The deviation of 0.05 mm could be optionally eliminated by a software program, which is executed in the control unit 6. Since the resolution is also limited by the timer of the control unit 6, the control unit 6 should be operated at least at around 8 MHz or faster, preferably at around 16 MHz or faster. In total, a resolution of 0.2 mm and 0.1 mm, respectively of the operation speed, can be obtained.

Another influence that can falsify the measurement is, if the liquid level 5 is not calm, but has a turbulent surface, caused for example by movement of the beverage machine 1. The caused level deviations are worse at the edges of the tank 2 than they are in the center of the tank 2. Thus, the ultrasonic transceiver 3 mentioned above, should be located near the center of the tank 2 to achieve better results. Furthermore, the control unit 6 is adapted to average the measurements, and to level out any deviations occurring in short time periods. The control unit 6 can average for about 0.5 seconds. The resolution of the determination of the distance d from the tank bottom to liquid level 5 enters into the determination of the flow rate, which is performed in the control unit 6.

In a general manner, the drained liquid volume (e.g., water dispensed volume) is evaluated by the following equation: $V=\int_{x1}^{x2} area(x)dx$ where the area (x) is the water area at the water level position x and the volume is the drained liquid (e.g. water) volume between x1 and x2.

Additional measures, which counteract surface turbulences, can be advantageously employed to improve the reliability and the resolution of the ultrasonic measurements and the determination of the distance d. For example, the tank 2 can be mounted floatingly onto the dispenser 7, with one or more buffers between dispenser 7 and tank 2. Movements of the beverage machine 1, caused by user operation, transfer to the dispenser 7, but are compensated for the tank 2 by the buffers between tank 2 and dispenser 7. Thus, movement of the tank 2 is reduced. The buffers can be of an elastic rubber material, or any other material suited to damp vibrations. The buffers are in contact with the tank 2 and the dispenser 7, holding the tank 2 in place without direct contact between tank 2 and dispenser 7. Therefore, vibrations transferred from the dispenser 7 to the tank 2 are damped resulting in a calmer liquid surface.

The tank 2 could also be provided with an inner container, in which the liquid is held. The inner container could be pivoted in the tank 2 by means of movable or rotatable connections between inner container and tank 2. If the tank 2 is subjected to movement, the inner container will, due to its weight, slightly move inside the tank 2 and compensate the movements. Care has to be taken, that no air is present between the inner container and the walls of the tank 2, and that the container is made of a material, which does not disturb the ultrasonic waves 4a, 4b form entering/exiting the inner container.

Also conceivable is to fill the tank with a sponge-like material, which penetrates the liquid and prevents wave formation, thus resulting in a calmer liquid surface. The filling material has to be designed such, that the liquid can still be easily be pumped out of the tank 2 into the dispenser 7 by the beverage machine 1. Moreover, the material of the filling has to be permeable and ineffective to the ultrasonic waves 4a, 4b, so that reflections only take place at the liquid level 5. Instead of a complete filling of the tank 2 with the sponge-like material, single disturbing elements, for example made of plastic, could be arranged inside the tank 2, which disturb and thus reduce the formation of waves in the liquid. Alternatively, a swimming element with significant mass could be place at and/or closely under the liquid level 5 to prevent, due to its inertia, the formation of waves in the liquid.

The above mentioned examples all serve the purpose to calm the surface of the liquid in the tank 2, when the beverage machine is operated and a reading of the liquid level 5 is taken. Even though the beverage machine 1 should not be moved or tilted during operation, by handling the machine a user can cause the liquid in the tank 2 to move, and if the movement is not damped at the time of a measurement of the liquid level 5 or the flow rate, the accuracy of the measurement suffers. The present invention can be also provided with not mentioned state of the art techniques, which are known to result in a calm liquid surface or a compensation of movement of the tank 2.

FIG. 6 shows a unijunction transistor (Q12N6027), with which the ultrasonic transceiver 3 is stimulated by short voltage pulses. The time between the pulses can be adjusted with the resistor R1 and the capacitor C1. With the resistors R2 and R3 the switch level can be controlled. The resistor is used to stimulate the transceiver 3, especially when a determination of the flow rate is performed. With every stimulus the ultrasonic transceiver 3 emits ultrasonic waves 4a, and can determine a distance d. If liquid flows out of or into the tank 2, this distance d changes with time i.e. with each measurement, and the control unit 6 can determine the flow rate. To get an accurate flow rate, the time between the pulses should be as short as possible. In the best case, the measurement is performed continuously. However, the evaluation is limited by the speed of the control unit 6, and the speed of the ultrasonic transceiver 3.

FIG. 7 shows a typical signal, as received by the ultrasonic transceiver 3. The signal is recorded with an oscilloscope. The signal is presented and evaluated by a software program. The time between the emitted ultrasonic wave 4a and the reflected ultrasonic wave 4b is about 42 µs. This calculates to a distance d between bottom of the tank 2 and the liquid level 5 of about 29.4 mm.

FIG. 8 shows a Schmitt-Trigger circuit, which is used to evaluate the time difference between the emitted ultrasonic waves 4a and the received reflected ultrasonic waves 4b. Because the ultrasonic transceiver 3 has a high resonance frequency, the response time of the comparator should not be longer than 200 ns.

In summary, a beverage machine 1 with integrated ultrasonic transceiver 3 was presented, and a method for operating the transceiver 3 was described, with which the liquid level 5 in a tank 2 of the beverage machine 1 and/or the flow rate into or/and out of the tank 2 can be determined fast, easily, and with high precision. For both measurements, only a single integrated ultrasonic transceiver 3 has to be implemented into a dispenser 7 of the beverage machine 1, thus saving space and costs in comparison to state of the art machines, which use two separate measuring devices.

Due to a special valve assembly between the tank 2 and the dispenser 7 of the beverage machine 1, a good coupling of ultrasonic waves 4a into the liquid of the tank 2 can be ensured. Moreover, since the machine is designed such, that the ultrasonic transceiver 3 is positioned in the dispenser 7, the tank 2 can be built simple, and can be cleaned and refilled easily. A simple connection mechanism between the tank 2 and the dispenser 7 can be used, like e.g. a non-return valve, which allows the liquid only to pass from tank 2 to dispenser 7. By placing the transceiver 3 into a cavity 10, it is protected from the liquid, and the lifetime of the measurement system is improved.

The ultrasonic transceiver 3 determines the time difference between emitted ultrasonic waves 4a and received ultrasonic waves 4b, which are reflected at the interface 5 of liquid and air in the tank 2, and determines a corresponding distance d from the bottom of the tank 2 to the liquid level 5. For a determination of the flow rate into or out of the tank 2, a control unit 6 relates the change of the distance d with time to an increased or decreased liquid volume.

By optimizing the analysis of the received ultrasonic waves 4b, and optimizing the electronic components, a very good resolution for the determination of the liquid level 5 and the flow rate can be achieved.

FIGS. 9 and 10 represent another mode of the beverage machine of the invention. The machine comprises a dispenser 7 with a seat 20 forming a recess for receiving a bottom portion 21 of the tank 2. It should be noted that the whole beverage machine is not represented but only its top part. The water tank comprises a bottom wall 22 with a cavity for receiving the ultrasonic transceiver 3. The transceiver 3 is lodged in a cavity 23 of the bottom wall forming a recess and closed by a lid 24 (or top wall). The transceiver is preferably encased in the cavity in isolation from the liquid contained in the tank.

A seal member such as an O-ring 25 is provided to ensure a liquid-tight closure of the cavity with the transceiver inside. As a result, ingress of liquid from the tank is prevented and the electronic/electrical components of the transceiver are durably protected. The bottom of the cavity has small apertures for enabling the connectors 26 of the transceiver, in particular, two spring-biased pins, to transverse the tank and to protrude outwardly. The connectors form with electrical/electronic contacts positioned in the seat of the dispenser, wireless connection means. The connection is so obtained as a result of the tank being inserted in the seat of the dispenser. The electrical/electronic contacts of the dispenser are in communication with a control unit of the dispenser or beverage machine (not shown). Of course, the connectors 26 could also be fixed, i.e., not retractable, whereas the contacts 27 could be placed in recess to allow the insertion of the fixed connectors. The connectors 26 could also be flat (non-protruding) surfaces which cooperate with retractable contacts protruding from the surface of the seat. Finally, the connectors could be in recess to cooperate with fixed contacts in relief on the seat of the dispenser.

Furthermore, the tank comprises a valve 8 through its bottom wall which is axially separate from the transceiver 3. The valve is known per se and is positioned inside a rigid tubular portion 28 of the tank which fits into the liquid inlet 29 of the dispenser. Furthermore, a spring 14 of the valve allows the automatic closing of the valve aperture when the tank is disengaged from the seat. The liquid inlet 29, as known per se, comprises an inside finger to lift the valve upwardly. The tank may further comprise a lid 32 removably inserted in a refill opening of the body 33 of the tank. A handle 34 may be provided, such as integrally part of the body, to facilitate handling and removal of the tank from the seat of the dispenser.

The bottom portion 21 of the tank comprises a support means such as a ring portion 38 surrounding the bottom wall 22 of the tank which includes the transceiver 3 and valve 8. The ring portion 38 has a height "H" greater than the length of the tubular portion 28 to ensure that the water tank can lie in a stable upright position on a planar surface (e.g., a kitchen table) without the valve touching the table. As a result, the valve, and so the liquid line, is not contaminated by possible contact with the surface of the table.

The advantage of such tank's construction is that the ultrasonic device is less prone to the liquid turbulence, backflow effect or air bubbles trapped in the valve.

The seat 20 of the dispenser also further comprises three zones of different vertical level; a first zone 35 of highest level comprising the inlet opening 29; a second zone 36 of middle level comprising the electrical/electronic contacts and a third zone 37 of lower level for receiving the ring portion 38 of the tank and serving as an annular reservoir for residual liquid. Therefore, the risk of liquid ingress in the transceiver is reduced.

In order to ensure a reliable wireless connection of the transceiver, the valve is preferably positioned in an off-centered manner so that its protruding tubular portion 28 engages in the opening only in a single angular position of the tank in the seat. Additional lock means such a small hook 30 can be provided in the tank which engages in a recess 31 of the seat. The lock means prevents the water tank from lifting with the strength of the connectors' springs when the tank is empty.

The tank may be designed so that its larger width is greater than its longer depth to ensure a more convenient cleaning and drying with a towel. For instance, its larger width is at least two times (e.g., 2.5 times) larger than its longer depth. The surface of the tank may also be smoothened to facilitate cleaning and drying.

Finally, the dispenser 7 may comprise an alerting signal unit comprising a LED 40 for indicating when the level of water (or liquid) in the tank is insufficient. An insufficient level of water may be programmed as a level slightly larger (e.g., 1-10 ml more) than the level corresponding to the smallest amount of water needed for preparing a beverage, e.g., an infant formula preparation (e.g., 65 or 75 ml of water). The alerting signal unit can also disable the electrical supply to the pump in the beverage machine to ensure that a sufficient water level is maintained in the liquid circuit and pump.

The invention claimed is:

1. A beverage machine comprising:
    a tank holding a liquid for preparing a beverage;
    an outlet valve in fluid communication with the tank;
    a dispenser, to which the tank is connectable, the dispenser comprising an opening for receiving the outlet valve;
    at least one ultrasonic transceiver disposed in the opening of the dispenser below the valve, the position of the opening corresponding to the position of the valve, and the valve being designed to open to allow the at least one ultrasonic transceiver to emit and to receive ultrasonic waves in the liquid contained in the tank to determine a distance from the transceiver to the liquid level; and
    a control unit connected to the at least one ultrasonic transceiver, the control unit being adapted to determine changes in the distance with time and as a result of a volume of the liquid flowing out of the tank.

2. The beverage machine of claim 1, wherein:
    a profile of the tank is stored in the control unit; and
    the control unit is adapted to determine the volume of liquid flowing out of the tank based on the profile.

3. The beverage machine of claim 1 comprising an alerting signal unit for indicating whether the distance is greater than a predetermined threshold level.

4. The beverage machine of claim 1, wherein
    the dispenser comprises a cavity in which the at least one ultrasonic transceiver is located;
    the cavity is separated from a remaining portion of the dispenser; and
    if the tank and dispenser are connected, the outer surface of the top of the cavity is in direct contact with the liquid in the tank, and emits the ultrasonic waves into the liquid.

5. The beverage machine of claim 4, wherein the at least one ultrasonic transceiver is in direct contact with the inner surface of the top wall of the cavity.

6. The beverage machine of claim 1, wherein the at least one ultrasonic transceiver is connected on or at a bottom wall of the tank.

7. The beverage machine of claim 1, wherein the at least one ultrasonic transceiver is electrically connected to the dispenser by wireless connection means or by contactless connection means.

8. The beverage machine of claim 1, wherein the control unit is further designed to perform an A/D conversion to obtain a received signal corresponding to the received ultrasonic waves.

9. The beverage machine of claim 1, wherein the at least one ultrasonic transceiver is a 1.4 MHz sensor.

10. The beverage machine of claim 1, wherein the control unit is designed to analyze the received signal at a fixed given voltage level, whereby always the same period slope of the received signal is used for the analysis.

11. The beverage machine of claim 1, wherein the at least one ultrasonic transceiver comprises a piezoelectric element, which is adapted to be periodically stimulated by a voltage pulse to emit the ultrasonic waves.

12. A valve assembly between a tank and a dispenser, to which the tank is connectable, wherein the valve assembly comprises:
    a valve at the bottom of the tank;
    the tank and dispenser are in fluid communication, the position of the valve corresponds to the position of an opening at the top of the dispenser, and the valve is opened as a result of the fluidic connection; and,
    at least one ultrasonic transceiver is located in the dispenser and is designed to emit and to receive ultrasonic waves through the opening into and out of the liquid in the tank, in order to determine a distance from the tank bottom to the liquid level.

13. A beverage machine comprising;
    a tank;
    a dispenser;
    a control unit comprising a memory; and
    a valve assembly between the tank and the dispenser, to which the tank is connectable, wherein the valve assembly comprises:
    a valve at the bottom of the tank;
    the tank and dispenser are in fluid communication, the position of the valve corresponds to the position of an opening at the top of the dispenser, and the valve is opened as a result of the fluid connection; and,
    at least one ultrasonic transceiver is located in the dispenser and is designed to emit and to receive ultrasonic waves through the opening into and out of the liquid in the tank, in order to determine a distance from the tank bottom to the liquid level.

14. A method for monitoring a liquid level in a tank of a beverage machine, the method comprising:
    connecting the tank to a dispenser of the beverage machine, thereby opening a valve of the tank;
    emitting an ultrasonic wave through the valve into the liquid in the tank;
    receiving an ultrasonic wave reflected at the liquid level through the valve; and
    determining a distance from a tank bottom to the liquid level based on the ultrasonic waves.

* * * * *